July 29, 1952　　　J. D. CLEMENTS ET AL　　　2,605,154
SNACK RACK TRAY FOR AUTOMOBILE DOORS
Filed Sept. 26, 1949　　　　　　　　　　　　2 SHEETS—SHEET 1
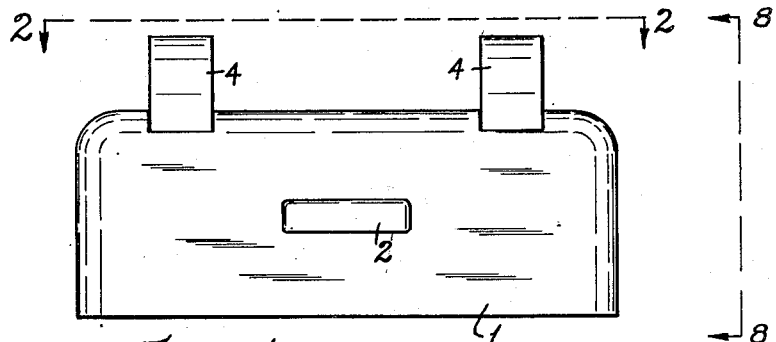
FIG. 1.
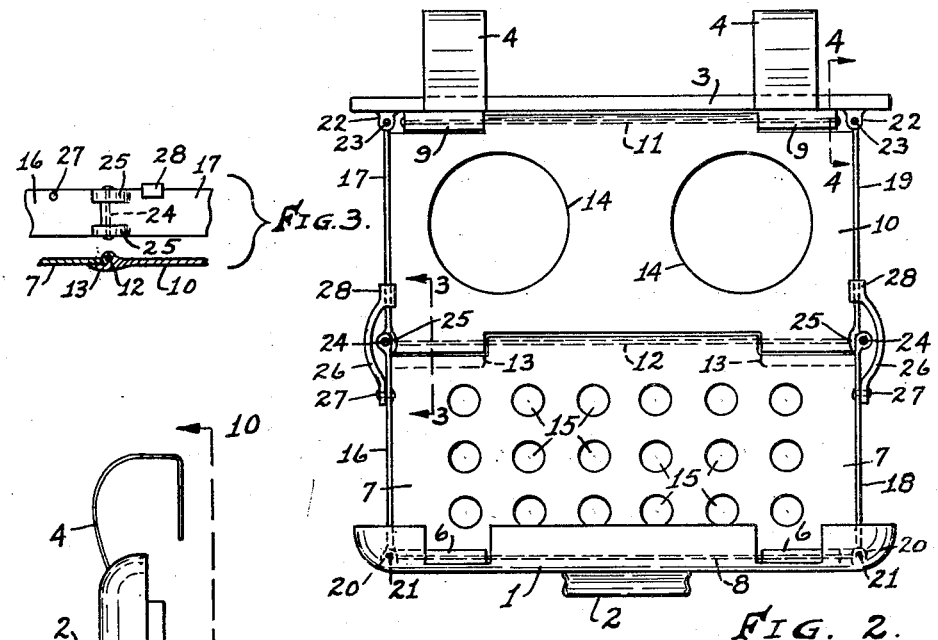
FIG. 2.
FIG. 3.
FIG. 4.
FIG. 5.
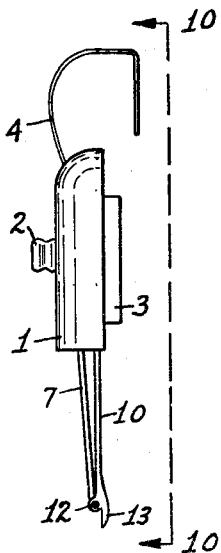
FIG. 6.
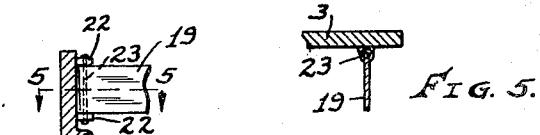
JAMES D. CLEMENTS,
GEORGE H. CLEMENTS,
and ROBERT E. SMITH,
INVENTORS
BY Donald E. Windle,
ATTORNEY.

July 29, 1952  J. D. CLEMENTS ET AL  2,605,154
SNACK RACK TRAY FOR AUTOMOBILE DOORS
Filed Sept. 26, 1949  2 SHEETS—SHEET 2
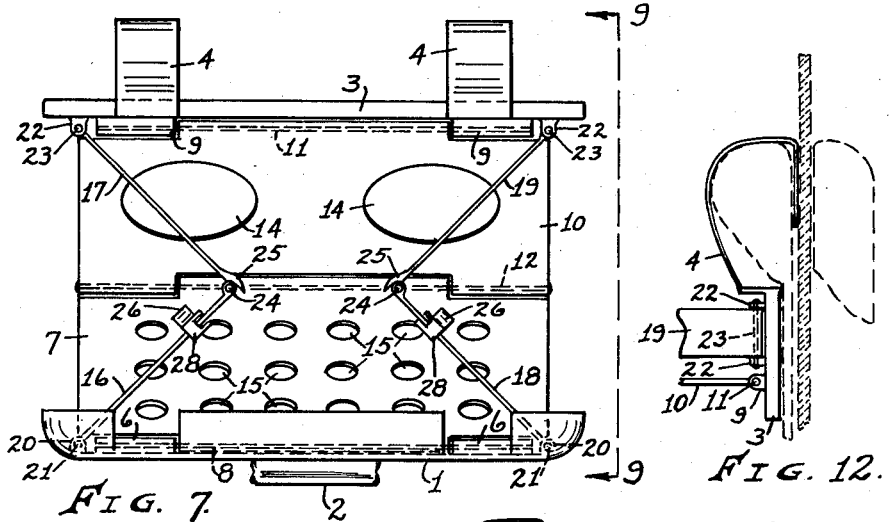
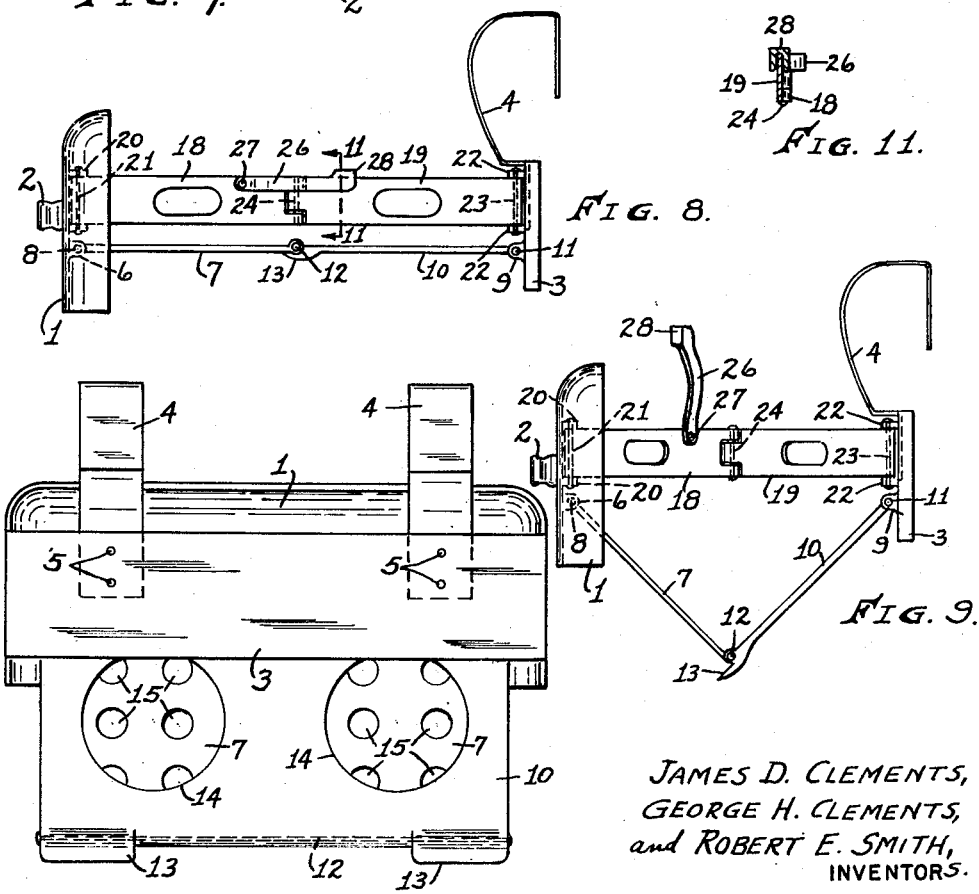
JAMES D. CLEMENTS,
GEORGE H. CLEMENTS,
and ROBERT E. SMITH,
INVENTORS.
BY Donald E. Windle,
ATTORNEY.

Patented July 29, 1952

2,605,154

UNITED STATES PATENT OFFICE 2,605,154

SNACK RACK TRAY FOR AUTOMOBILE DOORS

James D. Clements, George H. Clements, and Robert E. Smith, Richmond, Ind.

Application September 26, 1949, Serial No. 117,774

2 Claims. (Cl. 311—22)

The principal object of the invention is the provision of a collapsible rack which is readily adapted to be positioned in an automobile adjacent a window thereof, and for the purpose of providing a space for sandwiches, drinks, and the like.

A second object is the provision of a rack which is made of lightweight materials and which is collapsible, with the same occupying a minimum of space when collapsed.

Other objects and advantages of the invention will become more apparent in the course of the following description, and that which is new will be pointed out in the appended claims.

The most satisfactory means of carrying out the principles of the invention in a practical and efficient manner is shown in the accompanying drawings, in which:

Figure 1 is a front elevation of the device, with the same being shown in fully extended position.

Figure 2 is a detail plan of the device, as taken from line 2—2 of Figure 1.

Figure 3 is a detail section through a bottom member hinge joint, taken on line 3—3 of Figure 2.

Figure 4 is a detail section through the back member on line 4—4 of Figure 2.

Figure 5 is a detail section through a portion of the back member and an associated hinge joint, with the same being taken on line 5—5 of Figure 4.

Figure 6 is a side elevation of the device showing the same in collapsed condition.

Figure 7 is a plan view of the device similar to that shown in Figure 2 except the same is shown in partially collapsed condition.

Figure 8 is a side elevation of the device in fully extended condition, as taken from line 8—8 of Figure 1.

Figure 9 is a side elevation of the device when partially collapsed, as taken from line 9—9 of Figure 7.

Figure 10 is a rear elevational detail, taken from line 10—10 of Figure 6 and showing the device in collapsed condition.

Figure 11 is a detail section through the engaging portion of a locking arm, as taken on line 11—11 of Figure 8.

Figure 12 is a partial side elevation of the device in extended condition and showing the same in attached relation with the molding of an automobile, with the molding, glass, and outer portion of the automobile being shown in broken lines.

Like characters of reference designate like parts throughout the several views.

In order that the advantages and the novel features of the invention may be more fully apparent and better understood, we will now take up a detailed description thereof in which the same will be more fully set forth.

Referring now to the drawings in detail, numeral 1 designate the front member of the device, with the same having a handle 2 formed on or attached to the front surface thereof. The upper edge and the ends of the front member are curved and extend rearwardly from the face portion thereof, as shown in Figures 2, 6, 7, 8, 9 and 10.

3 designates the back member which is substantially the same length as front member 1. The back member has a pair of hangers 4 secured thereto by rivets 5, or by other suitable means, and with the hangers providing means through which the rack may be removably attached to an automobile, as more clearly shown in Figure 12.

Hinge studs 6 are formed on the rear face of the front member 1, and provide means for hingedly securing a forward bottom panel member 7 thereto by means of hinge pin 8, with the forward edge portion of panel member 7 extending between the hinge studs 6.

Hinge studs 9 are formed on the forward face of rear member 3 with the same providing means for hingedly securing the rear bottom member 10 therebetween, and with the hinge pin 11 securing the panel 10 in hinged relation with hinge studs 9.

Forward bottom panel member 7 and rear bottom panel member 10 are hingedly secured together by means of hinge pin 12. Stop members 13 are formed on the forward edges of rear bottom panel member 10 and extend forwardly therefrom and underlie portions of forward bottom panel member 7, with the stop members 13 providing means preventing folding the bottom panel members in the wrong direction when collapsing the device. Rear bottom panel member 10 is provided with apertures 14 which provide for the reception of liquid containers. A plurality of apertures 15 are shown formed through forward bottom panel member 7. Apertures 15 are primarily formed through the panel to eliminate excess weight, but also provide a certain decorative effect thereto.

Front member 1 and rear member 3 are extensible with relation to each other by means of foldable arms or side panels 16, 17, 18 and 19.

The forward ends of arms 16 and 18 are hingedly secured to the rear side of member 1 by means of hinge pins 21 extending through hinge lugs 20 which are formed integrally with the member 1. Rear ends of arms 17 and 19 are hingedly secured to the rear or back member 3 by means of hinge pins 23 extending through the hinge lugs 22 which are preferably formed integrally with the rear or back member 3. The rear ends of arms 16 and 18 are each hingedly secured to the forward ends of respective arms 17 and 19 by means of hinge pins 24. Stop members 25 are formed at the forward ends of arms 17 and 19 and engage the inner faces of arms 16 and 18 when the rack is in extended condition. The stop members 25 prevent folding of arms outwardly while the rack is in extended condition and also prevent folding the arms in the wrong direction when collapsing the device.

In order to prevent accidental folding of the device, we have provided locking arms 26, one of which is pivotally secured to each of arms 16 and 18 by means of a rivet 27. The free end of each of the locking arms is provided with an engaging channel 28 which is adapted to straddle a respective arm 17 or 19, as more clearly shown in Figure 11.

Operation

In extending the device from the position shown in Figure 6 to the position shown in Figure 2, front 1 and back 3 are moved away from each other to the limit of their extending movement. Said extending movement brings bottom panels 7 and 10 to a common plane, and with the same movement brings arms 16, 17, 18 and 19 from their folded position to the position shown in Figure 2. After the rack is in fully extended condition, locking arms 26 are pivoted to the positions shown in Figures 2 and 8 and with the channelled ends 28 thereof engaging the upper edges of arms 17 and 19 and thereby locking the rack in extended condition. Hangers 4 may then be hooked over the interior or exterior moldings of an automobile and with the rack being supported thereby and adapted to receive food and drinks.

After the rack has served its immediate purpose, the same may be removed from its hanging position and collapsed by first swinging locking arms upwardly out of engagement with arms 17 and 19, as shown in Figure 9, after which the side arms 16, 17, 18 and 19 are pressed inwardly at the central portions thereof, and with the centrally located hinge point of the bottom panel members being pressed downwardly, as shown in Figure 9, and after which a continuation of the collapsing movement brings the front and back members together, as shown in Figure 6. It will be noted that, when the rack is in collapsed condition, arms 16, 17, 18 and 19 are folded within the space formed between the front member 1 and the back member 3.

While we have shown and described the desired form, we desire that it be understood that minor changes may be made in the several parts and in the arrangement thereof, insofar as the changes therein may fall within the scope of the appended claims.

Having now shown and described the invention, what we claim, is:

1. In a snack rack, a front member and a back member, said members being in opposed relation with each other, a pair of bottom panel members hingedly secured together, with one of the bottom panel members being hingedly secured to the front member and the other bottom panel member being hingedly secured to the back member, two pairs of foldable arms, each pair being hingedly secured together, with one end of each pair of arms being hingedly secured to the front member with the opposite end thereof being hingedly secured to the back member and with one pair of foldable arms being in opposed relation with the other pair, with the folding movement of the arms and the bottom panel members bringing the front and back members together, stop members formed on the foldable arms and limiting the extended movement thereof, and means pivotally secured on the foldable arms locking the arms in extended position.

2. A snack rack comprising a front member and an opposed back member, two pairs of foldable arms with each pair of arms being hingedly secured together with one end of each pair being hingedly secured to the rear face of the front member and with the opposite end thereof being hingedly secured to the front face of the back member, a pair of hinged-together bottom panel members one of which is hingedly secured to the rear face of the front member with the other panel member being hingedly secured to the forward face of the back member, a locking arm pivotally secured to one of each pair of the foldable arms, which each locking arm being provided with a channelled slot adapted to engage the other arm of the pair of arms, with engagement of the locking arms with the foldable arms providing means maintaining the foldable arms in rigid extended position, and with stop members formed integrally with the arms and limiting the extended movement thereof.

JAMES D. CLEMENTS.
GEORGE H. CLEMENTS.
ROBERT E. SMITH.

REFERENCES CITED

The following references are of record in the file of this patent:

UNITED STATES PATENTS

| Number | Name | Date |
|---|---|---|
| 521,905 | Young | June 26, 1894 |
| 582,229 | Reynolds | May 11, 1897 |
| 1,194,019 | Hirsch | Aug. 8, 1916 |
| 2,229,646 | Firestone | Jan. 28, 1941 |

FOREIGN PATENTS

| Number | Country | Date |
|---|---|---|
| 329,788 | Great Britain | May 29, 1930 |